3,591,324
DYEING POLYAMIDES WITH MONOAZO DYES CONTAINING ACID GROUPS

Johannes Dehnert, Ludwigshafen, Walter Grosch, Mannheim, and Gergard Gnad, Ludwigshafen, Germany, assignors to Badische Anilin- & Soda-Fabrik Aktiengesellschaft Ludwigshafen (Rhine), Rhineland-Pfalz, Germany
No Drawing. Continuation-in-part of application Ser. No. 703,273, Feb. 6, 1968. This application Nov. 21, 1969, Ser. No. 878,939
Claims priority, application Germany, Feb. 14, 1967, P 16 44 056.5
Int. Cl. D06p 1/02
U.S. Cl. 8—41                5 Claims

ABSTRACT OF THE DISCLOSURE

Process for dyeing and/or printing synthetic polyamides with dyes containing sulfonic acid groups and derived from 3-aminophthalimides, or 4-aminophthalimides, and 2-amino-8-hydroxynaphthalene-6-sulfonic acid.

---

This application is a continuation-in-part of application Ser. No. 703,273, filed Feb. 6, 1968 (now abandoned).

This invention relates to a process for dyeing and/or printing synthetic polyamides with monoazo dyes containing sulfonic acid groups and having the general Formula I:

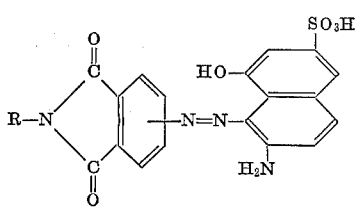

(I)

where R denotes a hydrogen atom or an unsubstituted or a substituted aliphatic, cycloaliphatic, araliphatic, aromatic or heterocyclic radical.

The dyes are obtained by coupling a diazo compound of an amine having the general Formula II:

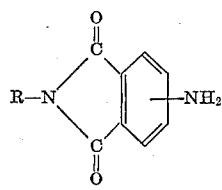

(II)

where R has the above meaning with 2-amino-8-hydroxynaphthalene-6-sulfonic acid in an acid medium.

The diazo components having the Formula II may be 3-aminophthalimide or 4-aminophthalimide or the N-substitution products of these compounds whose imide hydrogen atom may be replaced by the following radicals: methyl, ethyl, 1-propyl, 2-propyl, 1-butyl, 2-butyl, t-butyl, phenyl, hexyl, heptyl, octyl, nonyl, decyl, cyclohexyl, cyclooctyl, benzyl, 1-phenylethyl, 2-phenylethyl, 1-naphthyl, 2-naphthyl, 2-thienyl, 3-thienyl or 2-thiazolyl. These radicals may in turn bear for example chlorine or bromine atoms or alkyl, hydroxy, methoxy, ethoxy, nitrilo, amido, phenoxy, acetoxy or benzoyloxy groups.

The following specific compounds having the Formula II are given by way of example:

4-aminophthalimide,
4-aminophthalomethylimide,
4-aminophthaloethylimide,
4-aminophthalopropylimide,
4-aminophthaloisopropylimide,
4-aminophthalo-n-butylimide,
4-aminophthalisobutylimide,
4-aminophthalo-t-butylimide,
4-aminophthalo-n-hexylimide,
4-aminophthalo-6-hydroxy-n-hexylimide,
4-aminophthalo-2-ethyl-n-hexylimide,
4-aminophthalo-2'-hydroxyethylimide,
4-aminophthalo-2'-cyanoethylimide,
4-aminophthalo-2'-methoxyethylimide,
4-aminophthalo-3'-hydroxypropylimide,
4-aminophthalo-3'-methoxypropylimide,
4-aminophthalo-2'-hydroxypropylimide,
4-aminophthalo-2'-acetoxyethylimide,
4-aminophthalo-2'-propionyloxyethylimide,
4-aminophthalocyclohexylimide,
4-aminophthalocyclooctylimide,
4-aminophthalo-2'-benzoyloxyethylimide,
4-aminophthalocarboxymethylimide,
4-aminophthalobenzoylimide,
4-aminophthalo-2'-phenylethylimide,
4-aminophthalophenylimide,
4-aminophthalo-o-methylphenylimide,
4-aminophthalo-m-methylphenylimide,
4-aminophthalo-p-methylphenylimide,
4-aminophthalo-o-chlorophenylimide,
4-aminophthalo-m-chlorophenylimide,
4-aminophthalo-p-chlorophenylimide,
4-aminophthalo-p-ethylphenylimide,
4-aminophthalo-p-butylphenylimide,
4-aminophthalo-3',5'-dimethylphenylimide,
4-aminophthalo-2',4'-dimethylphenylimide,
4-aminophthalo-o-methoxyphenylimide,
4-aminophthalo-p-methoxyphenylimide,
4-aminophthalo-α-naphthylimide,
4-aminophthalo-β-naphthylimide;

compounds in which the radical R denotes a norbornyl radical, a dicyclopentadienyl radical, a tricyclopentadienyl radical, or a radical having the formula

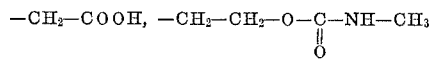

or

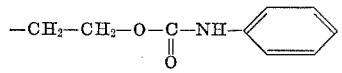

The corresponding 3-aminophthaloimide derivatives are also suitable as compounds having the Formula II.

The compounds having the Formula II may be diazotized by conventional methods, for example in the presence of dilute hydrochloric acid or sulfuric acid in water or a mixture of water with an organic solvent. During the coupling the pH range is advantageously chosen so strongly acid that the reaction only just proceeds.

In the dyeing process according to this invention dyes are preferred in which R denotes a hydrogen atom, a linear or branched alkyl radical having one to ten carbon atoms which may be unsubstituted or may bear as substituents hydroxy groups, cyano groups, chlorine atoms, alkoxy groups, alkanoyloxy groups or aryloxy groups, a cycloalkyl radical having one to three rings, a benzyl group, a phenylethyl group, a phenyl radical bearing a chlorine atom, a bromine atom, an alkyl group or an alkoxy group as substituent, or a phenyl group or naphthyl group.

Dyes having the general formula:

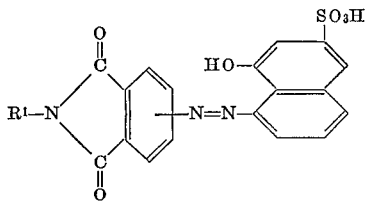

where $R^1$ denotes a hydrogen atom or methyl, ethyl, propyl, isopropyl, n-butyl, isobutyl, t-butyl, n-hexyl, 2-ethyl-n-hexyl, cyclohexyl, clyclooctyl, norbornyl, hydrogenated dicyclopentadienyl, unhydrogenated dicyclopentadienyl, hydrogenated tricyclopentadienyl, unhydrogenated tricyclopentadienyl, hydroxyethyl omega-hydroxy-n-hexyl, alkoxyethyl having three or four carbon atoms, alkoxy propyl having four or five carbon atoms, dihydroxypropyl, acetoxyethyl, propionyloxyethyl, benzoyloxyethyl, chloroethyl, cyanoethyl, benzyl, phenylethyl, phenyl, alkylphenyl having seven to ten carbon atoms, alkoxyphenyl having seven or eight carbon atoms, chlorophenyl, naphthyl or a group having the formula:

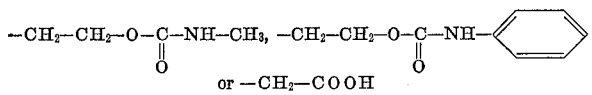

are of special industrial importance for the dyeing and/or printing of synthetic polyamides.

The dyes having the Formula I give bluish red to claret dyeings having very good light fastness from an acid liquor on synthetic polyamide fibers. They have adequate to very good leveling power and give dyeings having good to very good wet fastness. Dyeings having excellent fastness properties are obtained particularly on nylon 6 or nylon 6.6, but corresponding condensation products from dicarboxylic acids having eight, ten or twelve carbon atoms with diamines may be dyed as well.

The dyes having the Formula I contain a sulfinic acid group and are soluble in water. The dye liquors and print pastes for dyeing and printing material such as fibers, flock, filaments, film, sheeting, and woven and knitted fabrics of polyamides therefore contain the dyes in dissolved from. The dyes may be used as free sulfonic acids or as salts, preferably as alkali metal salts. Dyeing is generally effected from a weakly alkaline to strongly acid liquor, preferably from a neutral to weakly acid liquor, and advantageously at temperatures of from 90° to 100° C. or at superatmospheric pressure and temperatures of more than 100° C. The usual dyeing assistants, e.g. sulfonated sperm oil alcohol and the reaction product of 1 mole of castor oil and 40 moles of ethylene oxide, may be added to the dye liquors.

1,000 parts of dye liquor to be used in accordance with this invention for dyeing polyamide material usually consist of 0.1 to 10 parts of dye or dye preparation, if necessary 0.05 to 10 parts of the usual dyeing assistants, e.g. the reaction product of 1 mole of sperm oil alcohol and 80 moles of ethylene oxide, 0.5 to 5 parts of a base, e.g. ammonia, or 0.5 to 5 parts of an acid, e.g. formic acid, or 0.5 to 10 parts of a salt of a strong acid with a weak base, e.g. ammonium sulfate, and 950 to 995 parts of water.

1,000 parts of print paste to be used in accordance with this invention usually consist of 1 to 50 parts of dye or dye preparation in finely divided form, 200 to 650 parts of the usual thickeners, such as crystal gum, alginates or carob flour, if necessary 1 to 50 parts of the usual printing auxiliaries, e.g. resorcinol or β-naphthol, and 250 to 800 parts of water. After printing, the material is steamed as usual or subjected to a heat treatment and then finished off.

The dye liquors and print pastes may contain mixtures of several dyes having the Formula I.

The invention is further illustrated by the following examples. Unless stated otherwise, references to parts and percentages are by weight.

EXAMPLE 1

10 parts of polycaprolactam flock is dyed, at a liquor/goods ratio of 40:1, in a dye liquor containing 0.2 part of the dye having the formula

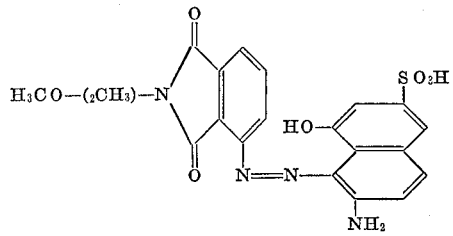

0.2 part of a leveling agent consisting of a mixture of (a) the adduct of 9 moles of ethylene oxide to oleylamine,
(b) the ethanolamine salt of the acid sulfuric ester of an adduct of 85 moles of ethylene oxide to aliphatic alcohols having 16 to 18 carbon atoms,
(c) propylene glycol and
(d) water, and 2% of 85% formic acid (with reference to the weight of the material to be dyed), dyeing being carried out for one hour at the boil. The goods are then rinsed with water. A bluish red dyeing is obtained having excellent fastness properties.

The dye is prepared as follows:

23.4 parts of 3-aminophthalic acid-gamma-methoxypropylimide is stirred with 200 parts of water, 25 parts by volume of concentrated hydrochloric acid is added with 100 parts of ice followed by 30 parts by volume of 23% sodium nitrite solution in one batch and the diazotization mixture is stirred for two hours at 0° to 5° C. A solution of 24 parts of 2-amino-8-hydroxynaphthalene-6-sulfonic acid in 10 parts by volume of 50% caustic soda solution and 250 parts of water is allowed to flow into the clear diazo solution in the course of half an hour. When the coupling is over, the whole is neutralized by adding sodium carbonate and the dye salt is precipitated at 40° C. by adding sodium chloride. The product is dried and a dark red powder is obtained which dissolves in hot water with a red coloration.

When using, instead of the dye indicated above, dyes prepared from the same coupling component and the diazo components specified in Table I below, very fast dyeings having the shades indicated are obtained.

In the table: E=Example No. and Shade=Shade of dyeing on polycaprolactam.

TABLE 1

| E | Diazo component | Shade |
|---|---|---|
| 2 | 4-aminophthalic acid-3'-methoxypropylimide | Claret. |
| 3 | 4-aminophthalic acid-2'-hydroxyethylimide | Do. |
| 4 | 3-aminophthalic acid-2'-hydroxyethylimide | Bluish-red. |
| 5 | 3-aminophthalic acid-2-acetoxyethylimide | Do. |
| 6 | 4-aminophthalic acid-2-acetoxyethylimide | Claret. |
| 7 | 3-aminophthalimide | Bluish-red. |
| 8 | 4-aminophthalimide | Claret. |

EXAMPLE 9

10 parts of a cloth of polyhexamethylenediamine adipate fibers are introduced into 400 parts by volume of a dye liquor containing 0.2 part of the dye having the formula

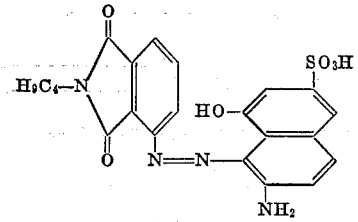

0.3 part of 30% acetic acid and 0.2 part of the leveling agent used in Example 1. Dyeing is commenced at 40° C.; the dye liquor is heated to the boil within 30 minutes and boiled for 60 to 90 minutes. The dyed cloth is then rinsed and dried. A clear bluish red dyeing is obtained which has very good light and wet fastness.

The dye is prepared as follows:

30 parts by volume of 23% aqueous sodium nitrite solution is allowed to flow slowly at 3° to 8° C. while stirring into a solution of 21.8 parts of 3-aminophthalic acid-n-butylimide in 300 parts by volume of glacial acetic acid and 25 parts by volume of concentrated hydrochloric acid. 100 parts of ice is added during the addition of the sodium nitrite solution. The whole is then stirred for another two hours at 0° to 5° C. and adjusted to a pH value of 4 by adding a 50% sodium acetate solution. A solution of the sodium salt of 24.3 parts of 2-amino-8-hydroxy-naphthalene-6-sulfonic acid in 250 parts by volume of water is slowly added to the diazo solution. When coupling is over, 300 parts by volume of saturated common salt solution is added with stirring and the precipitated dye is suction filtered, washed with 10% common salt solution and dried. A dark red powder is obtained which dissolves in water with a red coloration.

When using, instead of the dye indicated above, dyes prepared from the same coupling component and the diazo components specified in Table 2 below, dyeing having the shades indicated are obtained.

In the table: E=Example No. and Shade=Shade of dyeing on polyamide.

TABLE 2

| E | Diazo component | Shade |
|---|---|---|
| 10 | 4-aminophthalophenylimide | Bluish claret. |
| 11 | 3-aminophthalocyclohexylimide | Bluish red. |
| 12 | 4-aminophthalocyclohexylimide | Claret. |
| 13 | 3-aminophthalobutylimide | Bluish red. |
| 14 | 4-aminophthalobutylimide | Claret. |
| 15 | 3-aminophthalo-2'-benzoyloxyethylimide | Bluish red. |
| 16 | 4-aminophthalo-2'-benzoyloxyethylimide | Claret. |
| 17 | 3-aminophthalo-2'-methoxyphenylimide | Bluish red. |
| 18 | 4-aminophthalo-2'-methoxyphenylimide | Bluish claret. |
| 19 | 3-aminophthalomethylimide | Bluish red. |
| 20 | 3-aminophthaloisopropylimide | Do. |
| 21 | 3-aminophthalo-2'-ethylhexylimide | Do. |
| 22 | 4-aminophthalo-2'-ethylhexylimide | Claret. |
| 23 | 3-aminophthalo-3'-hydroxypropylimide | Bluish red. |
| 24 | 3-aminophthalo-2'-hydroxypropylimide | Do. |
| 25 | 3-aminophthalo-6'-hydroxyhexylimide | Do. |
| 26 | 3-aminophthalocarboxymethylimide | Do. |
| 27 | 3-aminophthalo-2'-methylcarbamoyloxyethylimide | Do. |
| 28 | 3-aminophthalobenzylimide | Do. |
| 29 | 3-aminophthalo-2'-phenylethylimide | Do. |
| 30 | 4-aminophthalo-2'-phenylethylimide | Claret. |
| 31 | 3-aminophthalocyclooctylimide | Bluish red. |
| 32 | 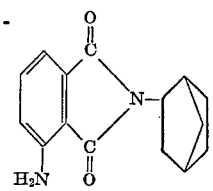 | Do. |

TABLE 2—Continued

| E | Diazo component | Shade |
|---|---|---|

(entries 33, 34, 35 shown with structures — Shade: Do.)

36 — (structure) — Claret.

37 — (structure) — Do.

| 38 | 3-aminophthalophenylimide | Bluish red. |
| 39 | 4-aminophthalopropionyloxyethylimide | Claret. |
| 40 | 3-aminophthalo-4'-methylphenylimide | Bluish red. |
| 41 | 3-aminophthalo-2',4'-dimethylphenylimide | Do. |
| 42 | 3-aminophthalo-α-naphthylimide | Do. |
| 43 | 4-aminophthalo-4'-methylphenylimide | Bluish claret. |
| 44 | 4-aminophthalo-2'-chloroethylimide | Claret. |
| 45 | 4-aminophthalo-2'-cyanoethylimide | Do. |

We claim:

1. A process for dyeing or printing a synthetic polyamide material which comprises applying to said polyamide material a dye of the formula

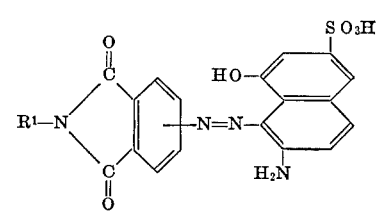

where R¹ denotes a substituent selected from the class consisting of hydrogen, methyl, ethyl, n-propyl, isopropyl, n-butyl, isobutyl, t-butyl, n-hexyl, 2-ethyl-n-hexyl, cyclohexyl, cyclooctyl, norbornyl, hydrogenated dicyclopentadienyl, unhydrogenated dicyclopentadienyl, hydrogenated tricyclopentadienyl, unhydrogenated tricyclopentadienyl, hydroxyethyl, omega-hydroxy-n-hexyl, alkoxyethyl having three to four carbon atoms, alkoxypropyl having four or five carbon atoms, dihydroxypropyl, acetoxyethyl, propionyloxyethyl, benzoyloxyethyl, chloroethyl, cyanoethyl, benzyl, phenylethyl, phenyl, alkylphenyl having seven to ten carbon atoms, chlorophenyl, alkoxyphenyl having seven to eight carbon atoms, naphthyl,

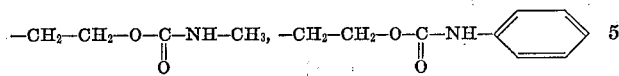

and —$CH_2$—COOH.

2. A process as claimed in claim 1 wherein the dye has the given formula in which $R^1$ represents methylphenyl.

3. A process as claimed in claim 1 wherein the dye has the given formula in which $R^1$ represents methoxypropyl.

4. A process as claimed in claim 1 wherein the dye has the given formula in which $R^1$ represents phenyl.

5. A process as claimed in claim 1 wherein the dye has the given formula in which $R^1$ represents butyl.

References Cited

FOREIGN PATENTS

| 1,358,145 | 3/1964 | France | 260—152 |
| 1,041,911 | 10/1958 | Germany | 8—41 |

GEORGE F. LESMES, Primary Examiner

T. J. HERBERT, Jr., Assistant Examiner

U.S. Cl. X.R.

8—178; 260—152

UNITED STATES PATENT OFFICE
CERTIFICATE OF CORRECTION

Patent No. 3,591,324          Dated July 6, 1971

Inventor(s) Johannes Dehnert, Walter Grosch and Gerhard Gnad

It is certified that error appears in the above-identified patent and that said Letters Patent are hereby corrected as shown below:

Column 1, line 5, in the heading, "Gergard" should read -- Gerhard --.

Column 3, line 45, "from" should read -- form --.

Column 4, line 15, that portion of the formula reading "($_2$CH$_3$)" should read -- (CH$_2$)$_3$ --.

Signed and sealed this 21st day of March 1972.

(SEAL)
Attest:

EDWARD M. FLETCHER, JR.　　　　　　　ROBERT GOTTSCHALK
Attesting Officer　　　　　　　　　　　Commissioner of Patents